(12) United States Patent  
Taghipour

(10) Patent No.: US 12,535,443 B2  
(45) Date of Patent: Jan. 27, 2026

(54) PHOTO-ACTIVATED SENSOR FOR ANALYZING CHEMICAL AND BIOLOGICAL FLUIDS

(71) Applicant: Fariborz Taghipour, Burnaby (CA)

(72) Inventor: Fariborz Taghipour, Burnaby (CA)

(73) Assignee: Fariborz Taghipour, Burnaby (CA)

( * ) Notice: Subject to any disclaimer, the term of this patent is extended or adjusted under 35 U.S.C. 154(b) by 214 days.

(21) Appl. No.: 17/701,070

(22) Filed: Mar. 22, 2022

(65) Prior Publication Data

US 2022/0299459 A1    Sep. 22, 2022

Related U.S. Application Data

(60) Provisional application No. 63/164,049, filed on Mar. 22, 2021.

(51) Int. Cl.
*G01N 27/07* (2006.01)
*G01N 33/483* (2006.01)
*G06F 1/16* (2006.01)

(52) U.S. Cl.
CPC ......... *G01N 27/07* (2013.01); *G01N 33/4836* (2013.01); *G06F 1/163* (2013.01)

(58) Field of Classification Search
CPC ..... G01N 27/07; G01N 33/4836; G06F 1/163
USPC .................................................. 324/600, 691
See application file for complete search history.

(56) References Cited

U.S. PATENT DOCUMENTS

| | | | |
|---|---|---|---|
| 8,323,982 B2 * | 12/2012 | LeBoeuf | B82Y 30/00 |
| | | | 436/805 |
| 9,194,807 B2 * | 11/2015 | Song | C12Q 1/44 |
| 11,378,541 B1 * | 7/2022 | Dong | G01N 27/327 |
| 2008/0231849 A1 * | 9/2008 | Myrick | G01N 21/45 |
| | | | 356/300 |
| 2009/0302235 A1 * | 12/2009 | Himmelhaus | G01N 33/582 |
| | | | 250/458.1 |
| 2011/0025351 A1 * | 2/2011 | van Breemen | G01N 27/3278 |
| | | | 324/693 |
| 2013/0059396 A1 * | 3/2013 | LeBoeuf | G01N 27/414 |
| | | | 204/407 |
| 2018/0080891 A1 * | 3/2018 | Potyrailo | G01N 27/04 |
| 2018/0263539 A1 * | 9/2018 | Javey | A61B 5/1477 |
| 2020/0003716 A1 * | 1/2020 | Tonouchi | B01J 20/205 |
| 2021/0063366 A1 * | 3/2021 | Potyrailo | G01N 33/0031 |
| 2021/0106260 A1 * | 4/2021 | Emaminejad | A61B 5/14532 |
| 2021/0181145 A1 * | 6/2021 | Stowell | B01J 20/28066 |
| 2021/0214251 A1 * | 7/2021 | Ragush | C02F 3/006 |
| 2021/0231597 A1 * | 7/2021 | Emokpae | G01N 27/028 |
| 2021/0381921 A1 * | 12/2021 | Beguin | G01M 3/16 |
| 2022/0001105 A1 * | 1/2022 | Shmilovich | A61M 5/16827 |

(Continued)

*Primary Examiner* — Jermele M Hollington
(74) *Attorney, Agent, or Firm* — Todd A. Rattray; Oyen Wiggs Green & Mutala LLP

(57) ABSTRACT

A sensor has a radiation emitter, a plurality of electrodes, a sensing material (transducer), and a recognition element (receptor, bioreceptor). The radiation element irradiates the sensing material, the plurality of electrodes are in electrical contact with the sensing material, and the recognition element is in contact, either directly or through an interface, with the sensing material. The sensing material receives radiation from the radiation source and interacts with the target material largely through the receptor. Further, the sensing material generates a measurable electrical signal upon interaction with a target molecule, when a potential is applied to the electrodes.

27 Claims, 5 Drawing Sheets

(56) References Cited

U.S. PATENT DOCUMENTS

2023/0000398 A1* 1/2023 Hochmuth ............ A61B 5/1468
2023/0309868 A1* 10/2023 Taghipour .......... G01N 21/6428
600/317

* cited by examiner

PHOTO-ACTIVATED SENSOR FOR ANALYZING CHEMICAL AND BIOLOGICAL FLUIDS

CROSS-REFERENCE TO RELATED APPLICATIONS

This application claims the benefit under 35 U.S.C. § 119 of application No. 63/164,049 filed 22 Mar. 2021 and entitled Sensor for Analyzing Chemical and Biological Fluids, which is hereby incorporated herein by reference for all purposes.

FIELD

This invention related to photo-activated sensors. Particular embodiments provide UV-activated sensors for analyzing fluids.

BACKGROUND

In general term, a sensor is a device, module, machine, or subsystem whose purpose is to detect events or changes in its environment. A chemical sensor may be considered to be a device that transforms chemical information (composition, presence of a particular element or ion, concentration, chemical activity, etc.) into a signal.

One type of chemical sensor is a biosensor. A biosensor may be considered to be an analytical device comprising a biological sensing element. A biosensor may harness the sensitivity and specificity of biology in conjunction with physicochemical detectors to deliver bioanalytical measurements or signals. Biosensors could provide critical insights into the performance and health of living organisms (e.g., humans, other animals, plants or other living organisms).

Chemical sensors may comprise: a recognition element (also referred to as a receptor) that interacts with (or binds with, or otherwise recognizes) the target molecule in an analyte under study; and a detection element (also referred to as transducer) that converts this interaction into a measurable signal. The signal output from a chemical sensor can be measured, amplified, otherwise processed, displayed by a suitable display device, interpreted and/or the like. Existing biosensors working based on such principles have several challenges. There is a general need for improved chemical sensors and/or biosensors.

SUMMARY

One aspect of the invention provides a sensor device comprising a sensing node or an array of sensing nodes and one or more radiation sources. The sensing node comprises a photo-activatable sensing material and a plurality of electrodes (for example, an electrode pair, which is usually referred to as working electrodes). The radiation source is optically configured (e.g., by suitable positioning and/or using suitable optical elements) to irradiate the sensing material.

The sensing node may comprise one or more recognition elements to interact with the target material(s)/molecule(s). The sensing node may comprise one or more membranes, for example, one or more disposable membranes. Such membranes may block interfering macromolecules.

The sensing material may comprise a semiconductor sensing material, for example. The sensing material may comprise metal oxides or mixed metal oxides, for example.

The sensing material may be provided in the format of a disposable sensing layer. When activated by radiation, the electrical properties of the sensing material may change in response to the presence of the target material(s)/molecule(s). Such changes may be detected using the electrodes.

The radiation source may comprise a solid-state ultraviolet (UV) emitter, for example, ultraviolet light emitting diodes (UV-LEDs). The radiation source may comprise one or more optical elements which may be shaped and/or located to direct the radiation toward the sensing node.

The plurality of the electrodes may comprise a set of interdigitated electrode pairs (e.g., working electrodes) to read the electrical activities of the sensing materials and generate corresponding electrical signals. The plurality of the electrodes may further comprise a reference electrode and a counter electrode.

Algorithms may be applied for analyzing the sensor signals—e.g., to the electrical signals output from the electrode pair. Such algorithms may be trained to find patterns in the electrical signals output from the electrodes (data sets) to identify and/or quantify the target materials/molecules (for example, biomarkers) of interest in an analyte that interact with the sensing material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Figure 1:
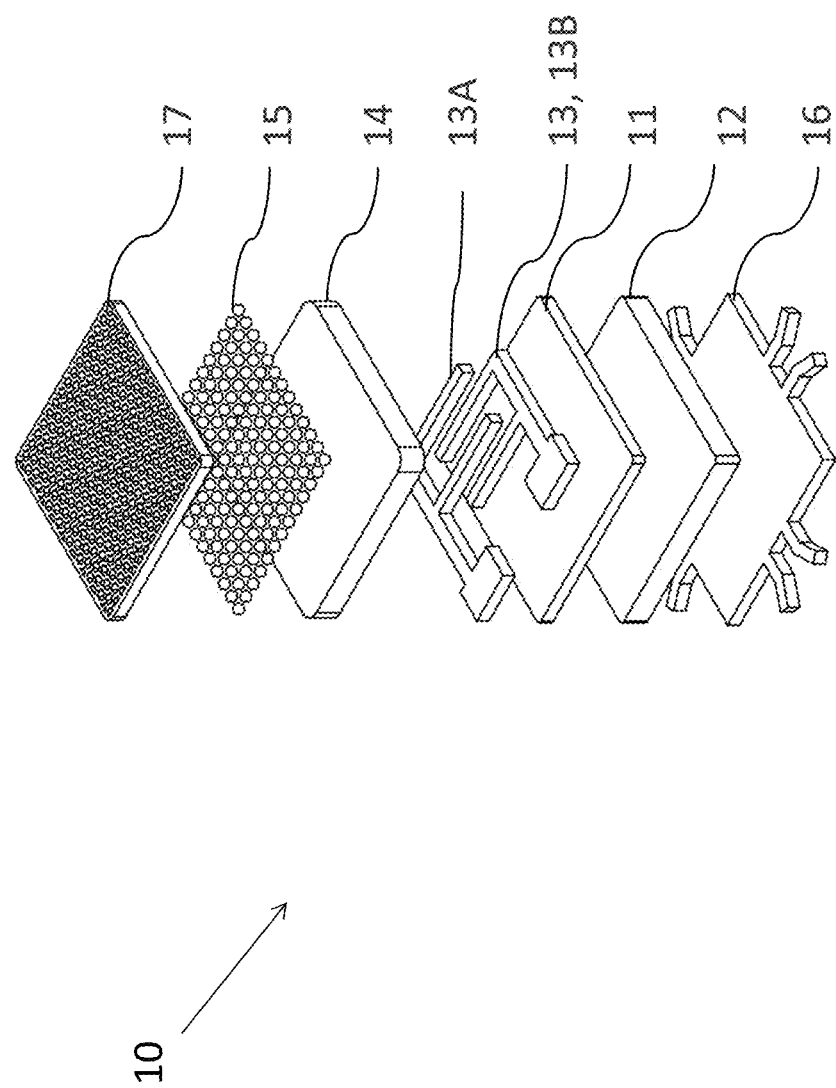
FIG. 1 illustrates an exploded view of a sensor and its components according to an example embodiment of the present disclosure.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

A sensor (or biosensor) device is provided comprising a sensing node or an array of sensing nodes and one or more radiation sources. The sensing node may comprise a photo-activatable sensing material and an electrode pair (e.g., a pair of working electrodes) to read the electrical activities (for example electrical conductivity, resistivity and/or other electrical characteristics) of the sensing materials. The radiation source, for example ultraviolet light emitting diode (UV-LED), may be configured (e.g., by suitable positioning and/or using suitable optical elements) to irradiate the sensing material. The sensing node may comprise one or more recognition elements (e.g., enzymes and/or the like, as discussed in more detail below) to selectively interact with specific target material(s)/molecule(s). The sensing node may comprise one or more membranes, for example, one or more disposable membranes. Such membranes may block and/or inhibit interfering macromolecules from accessing the sensing material. The sensing node may comprise a reference electrode and a counter electrode for outputting electrical signals and facilitating measurement of electrical signals.

Particular sensor embodiments may be capable of transmitting data automatically and wirelessly.

The photo-activated (for example, UV-activated) sensing material may interact (for example, react) with one or more chemical components (for example, lactate or glucose) of an analyte such as a biofluid (for example, sweat, blood, saliva, mucus, urine, stool, interstitial fluid, which is the body fluid between blood vessels and cell), a liquid or gas sample (such as water and air); and/or, in some embodiments, solid material. The interaction with interstitial fluid, for example may be through a patch in contact with the skin. These interactions/reactions may change the electron density or other electrical characteristics of the sensing material, resulting in corresponding changes to a signal in the electrode pairs. In some embodiments, the signals may be output from several electrodes and measured using suitable electronic components, including working electrodes, counter electrodes, and/or reference electrodes to facilitate measurement of electrical signals, as is known in the field of electrochemistry. In some embodiments, a potential (voltage) may be applied across one or more electrode pairs to facilitate the measurement of the output current signal, which may be responsive to changes (e.g., in resistance, conductivity and/or other electrical characteristics) of the sensing material. Characteristics of the output current signal (e.g., signal shape and/or magnitude) may be a function of the chemical composition of the analyte in contact with the radiation-activated sensing material (meaning the analyte may be either directly in contact with the sensing material or the analyte may be in contact with a recognition element (e.g., enzyme and/or the like, as discussed in more detail below) that is in turn in contact with the sensing material).

Based on this principle of operation, the presence and amount of any particular target molecule in an analyte may leave a specific "fingerprint" in the form of characteristics of an electrical signal for each sensor (or sensor node). These signals may be analyzed to identify the presence and quantity of target molecules in an analyte, a biomarker in a biofluid (for example, 40 mmol/liter of lactate in sweat) and/or the like. In some embodiments, pattern recognition techniques along with data analytics algorithms may be applied to analyze the sensor output signals in terms of target molecule identification and quantification. Such pattern recognition algorithms may use machine learning and/or deep learning to identify one or more patterns within the sensor output signals. For example, in some embodiments, algorithms may be trained to find patterns in the electrical signals generated by the electrodes (data sets) to identify and quantify the target materials/molecules (for example biomarkers) of interest in an analyte that interacts with the sensing material.

The combination of sensing element and electrodes may be disposable.

This sensor structure, in which radiation is applied for the activation of sensing material, may have advantages over other methods of activating sensing material, such as heat and/or electricity. For example, the use of photo-activated sensing material and the application of photons as the excitation source, instead of using heat as a source of activation, may expand the lifetime of sensing materials that degrade faster at high temperatures. As another example, the use of photo-activated sensing material and the application of photons as the excitation source, instead of using electricity and/or electric field as a source of activation, may result in more accurate and unbiased measurements, because of separating the excitation source (i.e., photons in the case of radiation activation) from one of the measurement components (i.e., electrical characteristics). Yet as another example, the use of photo-activated sensing material and the application of photons as the excitation source, instead of using electricity or heat as the activation source, may result in the ability to use a simpler (e.g. easier to manufacture, easier to source, less expensive and/or the like) sensing material, such as a metal oxide, that can be easily excited. As such photo-activated sensors may result in simpler sensor structure, simpler sensing material, and better sensitivity and selectivity for some applications.

Sensors may be provided with a plurality of sensing nodes. The sensing material for a sensor with multiple sensing nodes may differ for each sensing node, may be the same for all sensing nodes or may be different for different subsets of the sensing nodes. The sensing material may comprise a photo-activated material, such as a UV-activated semiconductor material, for example metal oxide, such as zinc oxide (ZnO), indium oxide ($In_2O_3$), iridium oxide ($IrO_2$), titanium dioxide ($TiO_2$), tungsten oxide ($WO_3$), zirconium oxide ($ZrO_2$), etc., and/or composite metal oxides, such as $ZnO/In_2O_3$ and/or the like. The sensing material, such as metal oxide and/or composite metal oxides, may have different structurers and morphologies, such as nano-particles, nano-rods, nano-fiber, nano-tubes, combinations thereof and/or the like. Different structure and morphologies may enhance sensitivity or response time by changing surface area, electron conductivity and/or other electrical characteristics of the sensing material. The sensing material, such as metal oxide or composite metal oxides, may be decorated/doped with metal particles (or nano-particles), such as platinum, gold, silver and/or the like, and/or one or more compositions of metal particles and/or metal oxide particles, such as manganese dioxide ($MnO_2$) and/or the like. The sensing material, such as metal oxide or composite metal oxides, may be decorated/doped with non-metal particles (or nano-particles) and/or combinations of non-metal particles, such as graphitic carbon nitride (g-$C_3N_4$), fluorine (F) and/or the like. The sensing material, such as metal oxide or composite metal oxides, may be decorated/doped with quantum dots and/or combinations of quantum dots, such as cadmium sulfide (CdS) quantum dots and/or the like. The sensing material, such as metal oxide or composite metal oxides, may be decorated/doped with one or more catalysts, such as dissociation, oxidation, adsorption catalysts and/or the like. The sensing material, such as metal oxide or composite metal oxides, may be functionalized (or surface functionalized) with one or more active chemicals, organometallic compounds and/or the like.

Decorating/doping of metal oxides with metal particles, non-metal particles, catalysts, functional groups and/or the like, may enhance sensitivity, selectivity, or response time of the sensor by changing the reaction sites, electron density distribution, electron conductivity and/or other electrical characteristics of the sensing material. The sensing material, such as metal oxide or composite metal oxides, may be combined with one or more electron conductive materials, such as graphene, and/or graphene derivatives, such as graphene oxide, reduced graphene oxides and/or the like. Combining metal oxide or composite metal oxides with electron conductive material such as graphene and/or graphene derivatives may enhance sensitivity or response time by changing the electron conductivity and/or other electrical characteristics of the sensing material.

The sensing material, such as metal oxide or composite metal oxides, may be combined (integrated, be in physical and/or chemical contact and/or interaction) with one or more recognition elements. Such recognition elements may comprise, for example biological recognition elements, such as receptors, biomolecules, imprinted polymers, nucleic acids, whole cells, antibodies, different classes of enzymes and/or the like. Combining sensing material with such biological recognition elements may facilitate the reaction with particular materials, molecules, biomarkers and/or the like. Combining sensing material with such biological recognition elements may additionally or alternatively enhance the selectivity of the sensing material for detection of one or more specific materials, molecules, biomarkers and/or the like in an analyte.

The sensing material or the combination of sensing material with the recognition element may be combined, integrated, or covered with porous material, including microporous, mesoporous, macroporous materials, and/or other general and/or ordered hierarchical porous materials. The microporous, mesoporous, macroporous and/or ordered hierarchical materials may act as a filter to prevent the diffusion of one or more undesired molecules to the sensing material or the recognition element. These porous materials may control the diffusion rate of one or more undesired molecules to the sensing material. The prevention and/or mitigation of diffusion of one or more undesired molecules may enhance the selectivity, sensitivity, detection capability and/or response time of the sensing material/sensor by blocking and/or delaying some interfering molecules from reaching the sensing material. Controlling the diffusion may additionally or alternatively enhance the selectivity, sensitivity, detection capability and/or response time of the sensor by separating particular molecules to react at different times with the sensing material, thereby permitting identification and/or quantification of each molecule separately. The porous material may additionally or alternatively enhance the transfer of some target molecules to the sensing material. In some embodiments, the recognition element, for example the enzyme may be combined or covered with chitosan or sulfonated tetrafluoroethylene based fluoropolymer-copolymer (e.g., Nafion™) for protection.

The photo-activated sensing materials may interact, for example react with particular chemical components, where this reaction generates and/or influences a signal (which may be referred to herein, without loss of generality, as generating a signal) in a manner that may by detected through the electrode pairs. For example, when a voltage potential is applied between the electrode pairs, the reaction between the photo-activated sensing materials and particular chemical components (that are presented as the result of the presence of the targe molecule or molecules) may change the conductivity of the sensing material, which may in turn influence the corresponding current between the electrode pairs. The signal shape and/or magnitude (e.g., the current shape and/or magnitude) may be a function of the sensing material and chemical composition of the analyte under study. For a sensor with multiple sensing nodes, since each sensor node may comprise different distinctive sensing material or may be combined with one or more different distinct recognition elements, a combination of signals may be generated, depending on the presence and amounts of various target molecules, for example biomarkers, for example lactate and/or glucose in sweat, and the reactions of such molecules with the different sensing nodes.

By analyzing the electrode signals from different sensors (and/or sensor nodes), the presence and amounts of target molecules (e.g., biomarkers) of interest may be assessed. In some embodiments, the analysis of the signals may be performed by utilizing machine/deep learning algorithms (e.g., algorithms trained to find patterns in data sets), to assess the presence and amounts of target molecules (e.g., biomarkers) of interest. A training model may be applied to teach the algorithms that interpret the sensor signals (for example, software that converts the signals to identify the presence and/or amount of target molecules) how to discriminate among different target molecules. A different training model may additionally or alternatively be applied to estimate the amount of different target molecules. The training model to teach the system, to discriminate for, or to detect the quantity of, a biofluid as an example, may be initiated with a limited number of data points (sensor response patterns) from artificial biofluid samples and/or from volunteers. The model may then be enhanced over time by collecting more data points from users, which may be collected through a suitable computing device (e.g., smartphone-based) application. Signals received by the sensor may be transferred through such an application to be analyzed in a central processing platform. Such a system of several sensing nodes may enable multiplexed measurement of several target molecules, for example biomarkers, more accurately. Such a system of several sensing nodes may also enable multiplexed measurement of several target molecules without the need of using a particular detection element on each sensing node for those target molecules, but instead by interpreting the signals generated by different sensors or sensor nodes comprising different sensing materials.

In some embodiments, the intensity and/or wavelength of radiation, for example UV photons emitted from one or more UV-LEDs, may be varied during the irradiation of the sensing material in contact with the analyte. For example, the sensing material may be excited at different intensities and/or wavelengths to generate various signals. Therefore, by activating the sensing material at different intensities (UV radiant power) and/or at different wavelengths (UV photon energy) over suitable period(s) of time, a response curve (different signals generated by the electrodes for various wavelengths, intensities, and/or a combination of both) may be generated. Such response curves may be analyzed to identify the presence and/or the amount of the target molecules (biomarkers). This approach of varying radiation intensity and/or wavelength may be advantageous for generating multiple signals, compared to other prior art methods because the intensity and/or wavelength of the radiation emitters, for example UV-LEDs, can be easily (e.g. precisely and quickly) altered. The approach of varying radiation intensity and/or wavelength to generate response curves may enhance the sensor performance relative to prior art techniques using heat activation or electrical activation, for example, by improving selectivity and/or sensitivity of the sensor to particular chemicals. Further, the approach of varying radiation intensity and/or wavelength to generate response curves may enable multiplexed measurement of several target molecules, for example biomarkers, without the need of using a particular detection element for each of the target molecules and instead by interpreting the signals generated by different sensors comprising different sensing material that have been irradiated at different intensities and wavelengths.

Because a sensing material may respond differently to different molecules when the radiant power (intensity) or photon energy (wavelength) changes, such differences in the responses may be analyzed (for example by a program or software) to detect and quantify target molecules. For example, for an analyte containing both glucose and lactate, both the glucose and lactate may react with sensing material A and B and those reactions may generate signals (for example changes in the electron density of sensing material that can be measured when a voltage potential is applied to the electrodes). However, for sensing material A, changing the irradiance (or wavelength) may only change the signal in the presence of glucose and for sensing material B, changing the irradiance (or wavelength) may only change the signal in the presence of lactate. Alternatively, the change in the signal rate may be different for sensing material A and B in the presence of different concentrations of glucose and lactate. Therefore, by monitoring the changes in the signals at different irradiances (or wavelengths) the amount of glucose and lactate may be estimated.

In some embodiments, a radiation transparent material (for example UV transparent material, such as quartz or a polymer sheet and/or the like) may be used as a substrate for the electrode(s) and/or the sensing material. Therefore, the sensing material on one side (the electrode side) is in electrical contact with the electrodes and transparent substrate and on the other side (the target side) may be in contact with the target material either directly or through a recognition element. When a transparent substrate is used, the sensing material may be irradiated by the radiation source from the electrode side of the sensing material (e.g., from the same side of the sensing material as the electrode(s) are located). This arrangement (having the radiation source on the electrode side of the sensing material) may be advantageous for some applications, as it allows interaction of the sensing material from the target side with an analyte, which is an open side of the sensing material that is not faced or blocked by the radiation source. Further, this arrangement (having the radiation source on the electrode side of the sensing material) may be advantageous for some applications, where the analyte is not highly transparent, for example where the analyte is blood, as having the radiation source on the electrode side of the sensing material allows the activation of the sensing material without the radiation passing through the analyte.

In some embodiments, the sensing material may be irradiated from the target side. In some embodiments, the sensing material may be irradiated from a lateral side of the sensing material (a plane normal to a plane of the electrode side). In some embodiments, the sensing material may be irradiated at an angle to the lateral side, for example 45 degree to a vector normal to a lateral plane, which is normal to the electrode side plane. In some embodiments, fiber optic elements and/or other optical elements may be used for irradiating the sensing material with radiation from the radiation source (e.g., UV-LED). Such arrangements may offer flexibility in the orientation of the sensing material and/or the manner in which the analyte is brought into contact with the sensing material.

In some embodiments, only one electrode may be in electrical contact with the sensing material. In some embodiments, three or four or other suitable numbers of electrodes may be used including one or more working electrodes, counter electrodes, and/or reference electrodes. The use of multiple electrodes may lead to sharper signals with less signal noise. In some embodiments a voltage potential signal (or current signal) may be applied to the electrodes to facilitate measurement of changes in the conductivity/resistivity and/or other electrical characteristics (e.g., by measuring current in the case of an applied voltage signal and/or by measuring voltage in the case of an applied current signal). In some embodiments, the signal from a combination of outputs from the electrodes (working electrodes, counter electrodes, and/or reference electrodes) may be measured (e.g. using suitable electronic components) and used to determine corresponding electrical characteristics. Measuring the signal from a combination of outputs from several electrodes (for example, counter electrodes, and/or reference electrodes, in addition to working electrodes) may facilitate measurement without applying potential. Additionally or alternatively, measuring the signal from a combination of outputs from several electrodes may facilitate measurement with lower applied potential for measuring the resistivity/conductivity, or other signals.

In some embodiments, sensors of the type described herein may be manufactured using the same fabrication process typically used for fabricating an ultraviolet light emitting diode (UV-LED) chip or UV-LED wafer by adding extra layers to the LED fabrication process (e.g., on top of the LED, either the LED chip or the LED package). Such extra layers may comprise, for example, a plurality of electrodes, sensing material, a recognition element and/or the like.

In some embodiments, the sensor comprises a UV-LED comprising a UV emitting chip, an electrode pair, a sensing material (transducer), and a recognition element (receptor, bioreceptor), wherein the UV emitting chip is configured to irradiate the sensing material, the electrode pair is configured to be in electrical contact with the sensing material, and the recognition element is configured to be in contact, either directly or through an interface, with the sensing material.

Applications of Particular Embodiments

Particular embodiments are applicable to a range of sensing devices and systems. UV-LED-activated sensing systems according to particular embodiments, alone or in combination with the application of machine learning and/or deep learning, are suitable for use as a broad class of sensors. One aspect of particular embodiments disclosed herein is a biosensor for analyzing biological fluids. Another aspect of particular embodiments disclosed herein is a gas sensor for air monitoring and/or other types of environmental monitoring. Specific applications may include monitoring of toxic compounds, chemical hazards, or environmental contaminants in air. Another aspect of particular embodiments disclosed herein is liquid sensor for water and/or other liquid-based materials. Specific applications may include monitoring chemical contaminants and biochemical hazards in water. Yet another aspect of particular embodiments is a sensor for monitoring soil components, for example nutrients in soil, such as nitrogen and/or nitrates in soil. Such soil measurements may be through direct measurement in contact with soil and/or or indirectly through analyzing the gas (air) in the vicinity of (and largely in equilibrium with) the soil.

The non-limiting example applications of particular embodiments as a biosensor for monitoring biological fluids and a sensor for monitoring soil nutrients are discussed below.

Biosensor: Aspects of the invention and/or particular embodiments may be applied to dynamic, non-invasive measurements of biochemical markers in biofluids allowing the monitoring of physiological health status, disease diagnostics and health management. For example, sensors may be applied for measuring several biomarkers of interest such as glucose, lactate, dopamine, cortisol, sugars, glycosaminoglycans and/or the like in biological fluids, such as sweat, blood, saliva, mucus, urine, stool, interstitial fluid and/or the like. As an example, in some embodiments the sensing material may comprise zinc oxide (for example, zinc oxide nanorods) and lactate oxide may be used as a recognition element (e.g., an enzyme) for detecting and/or quantifying lactate in biological fluids, such as sweat and/or other biological fluids. As another example, in some embodiments, the sensing material may comprise zinc oxide (for example, zinc oxide nanorods) and glucose oxide may be used as a recognition element (e.g., an enzyme) for detecting and/or quantifying glucose in biological fluids, such as sweat or other biological fluids.

One advantage of the proposed method and apparatus is the opportunity of collecting a relatively large volume of information from a biological sample over a relatively short period of time, when compared to the use of prior art biofluid sensors. For each sensor node reacting with a biofluid, a series of signals (in the form of a response curve) may be generated (for example, by varying the intensity and/or wavelength of the applied radiation). This approach (generating a response curve with different applied radiation intensities and/or wavelengths) contrasts with the approach of obtaining only a single value (e.g., a single value of radiation intensity and/or radiation wavelength) as is the case with many traditional sensors.

Soil nutrient sensor: Continuous monitoring of nutrient concentrations (e.g., in agricultural soil) is desirable in optimizing crop yield and/or quality. Nitrogen, phosphorus, and potassium (NPK) are some of the main soil nutrients that affect crop growth. Nitrogen is important for plant growth (structure), plant food processing (metabolism), and the creation of chlorophyll. The presence and/or quantity (e.g., concentration) of nitrogen represents desirable nutrient information for agricultural soil. Plants require more nitrogen than any other nutrient, but only a small portion of the nitrogen in soil (typically, mineral nitrogen, mainly nitrate ($NO_3^-$), and ammonium ($NH_4^+$) is available to plants. Nitrite is an intermediary compound formed during nitrification as well as denitrification. The nitrite then typically undergoes transformations into gaseous nitrogen compounds, such as nitric oxide (NO) and nitrogen dioxide ($NO_2$). Further, the microbial processes of denitrification and dissimilatory nitrate reduction to ammonium in soil produce nitrous oxide ($N_2O$). Therefore, there may be a correlation between the soil nitrate concentration and gaseous nitrogen compounds.

Aspects of the invention and/or particular embodiments provide systems and methods for detecting and/or quantifying nitrogen in soil by detecting and/or quantifying the concentration of nitrogen containing gases in air that is in the vicinity of (and may largely be in equilibrium with) the soil. Similarly, other embodiments provide systems and methods for detecting and/or quantifying other nutrients such as phosphorus, and potassium in soil by detecting and/or quantifying the concentration of related gases in air that is in equilibrium with the soil. Sensors according to particular aspects and/or embodiments may provide advantages over the current soil-nutrient-monitoring sensors that function based on direct contact with the soil. Sensors and methods according to particular aspects and/or embodiments may provide estimates of average values of soil nitrogen (the useful forms of it: nitrate/ammonia) because they may measure the nitrogen-containing gases in the air adjacent to the soil and in equilibrium with nitrogen (nitrate/ammonia) in the soil. Additional sensors, such as humidity sensors, temperature sensors and/or the like) may also be used for facilitating the conversion of nitrogen-containing gas concentrations to nitrogen content in the soil, because the correlation between the soil nitrate concentration and gaseous nitrogen compounds may be a function of temperature and humidity. As such, by measuring these temperature and humidity parameters, a more accurate relationship between the nitrogen-containing gas sensor signals and the soil nitrate concentration may be established.

Other aspects and/or embodiments of the invention provide systems and methods for monitoring soil nutrients and their potentially negative environmental impact (e.g., simultaneously), by measuring soil nutrients and discussed herein and by measuring the emission of agricultural greenhouse gases. Greenhouse gases may include $CO_2$, $CH_4$ and $N_2O$, with $CH_4$ and $N_2O$ presenting global warming potentials 25 and 298 times higher than $CO_2$, respectively. $N_2O$ emissions may take place in soils and may be related to agricultural activities. Monitoring $CH_4$ and $N_2O$ emissions can be applied to identify sources of greenhouse gases and individual contributions to greenhouse gases from soil.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

FIG. 1 illustrates an exploded view of a sensor 10 and its components according to an example embodiment of the present disclosure. Sensor 10 may be constructed on a substrate 16, which may be any suitable substrate that is convenient for fabricating sensor 10. Sensor 10 of the illustrated embodiment comprises: a transparent substrate 11, for example quartz or transparent polymer; a radiation source 12, for example a UV radiation sources such as UV-LED; a plurality of interdigitated electrodes 13A, 13B (collectively, electrodes 13) on transparent substrate 11; a sensing material 14 layered on, and in electrical contact with, electrodes 13 and optionally in contact with transparent substrate 11; an optional recognition element 15, for example an enzyme and/or the like; and an optional porous membrane 17, which may function as described above to allow particular molecules to access sensing material 14

(directly or through recognition element 15) while preventing or mitigating access by other molecules to sensing material 14.

Radiation source 12 of the illustrated (FIG. 1) embodiment is configured (e.g., by suitable positioning and/or suing suitable optical elements (not shown) to emit radiation to irradiate and activate (excite) sensing material 14 through transparent substrate 11. Sensing material (sensing layer) 14 is in electrical contact with electrodes 13 and may be in contact with transparent substrate 11. The arrangement of the FIG. 1 sensor 10 allows for irradiating sensing material 14 from the electrode side of sensing material 14—i.e., UV radiation from radiation source 12 passes through transparent substrate 11 and through the open spaces between and/or around electrodes 13 to reach sensing material 14, leaving the target side (i.e., opposite of the electrode side) of sensing material 14 and recognition element 15 open for interaction with the analyte containing target molecules. In some embodiments, radiation source 12 may be configured (e.g., by suitable positioning and/or using suitable optical elements such as optical lenses or fiber optics (not shown)) to irradiate sensing material 14 from a different direction. For example, in some embodiments, radiation source 12 may be configured to activate sensing material 14 from a side (i.e., a target side) of sensing material 14 opposite to the side (electrode side) of sensing material 14 that is in electrical contact with electrodes 13 or from some other orientation. In the illustrated embodiment, optional recognition element 15 (e.g., an enzyme and/or the like) is shown located between sensing material 14 and optional porous membrane 17.

Figure 2:
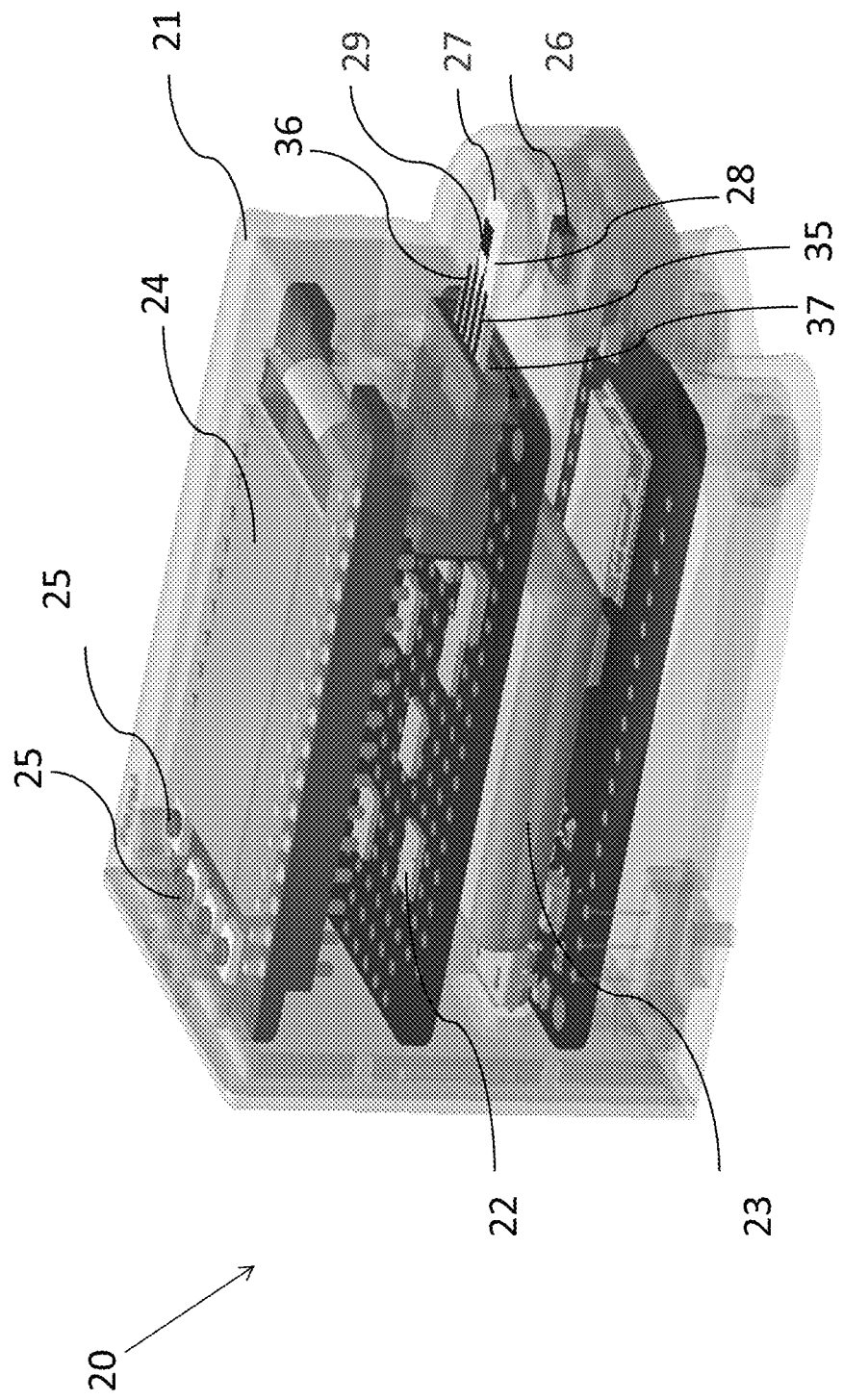
FIG. 2 Illustrates a sensing device, according to an example embodiment of the present disclosure.

FIG. 2 Illustrates a sensing device 20, according to an example embodiment of the present disclosure. Referring to FIG. 2, sensing device 20 of the illustrated embodiment comprises: a body 21; electronic components 22 (that are configured to measure electrical characteristics, such as current or conductivity/resistivity, from the electrodes 29 and translate the signals to a displayable or reportable quantity, for example the amount or concentration of one or more target molecules in an analyte), a battery 23, a display screen 24, control buttons 25, UV-LED 26, and a sensing node 27. Sensing node 27 comprises a transparent substrate 28, a plurality of interdigitated electrodes 29, a sensing material (not shown), for example zinc oxide on substrate 28 and in electrical contact with electrodes 29, an optional recognition element (not shown) which may comprise an enzyme may be coated on or combined with the sensing material.

Battery 23 powers device 20; electronic components 22 provide power (from battery or rechargeable battery 23) to UV-LED 26 and display screen 24, apply a potential to electrodes 29, and measure electrical characteristics (e.g., the current, conductance and/or resistance of the sensing material (e.g., between electrodes 29)). Sensing node 27 may be removable and may be inserted in and out of sensing device 20 through a slot 37. Control buttons 25 may turn LED on and off, or alter the irradiance or wavelength of the LED, etc.

For measuring a target molecule, for example glucose, in an analyte, for example sweat, a drop of the analyte may be placed on sensing node 27 comprising the sensing material (e.g., which may itself comprise zinc oxide for the example of detection of glucose in sweat). A recognition element (which may itself comprise glucose oxide for the example application of detection of glucose in sweat) may also be provided in contact with the sensing material. Glucose oxide (which may be present in the recognition element) can selectively interact with glucose molecules in the sweat. Other materials, for example polymers (which may itself comprise sulfonated tetrafluoroethylene based fluoropolymer-copolymer) may also be provided to protect the recognition element. When UV-LED 26 is turned on, the interaction of glucose with glucose oxide (in the recognition element) and zinc oxide (in the sensing material) changes the electron density (and conductivity) of the sensing material, generating an electric signal or altering an electric signal (e.g., altering the current associated with an applied voltage signal). This electric signal (and/or the change in this electric signal) may be measured from electrodes 29 (e.g., using suitable electronic components (not shown)). The characteristics (e.g., magnitude) of this signal may be correlated with (e.g., be a function of) the glucose concentration in sweat. Utilizing a suitable calibration curve, this signal can be converted to a corresponding glucose concentration, which can be displayed on display screen 24.

Figure 3:
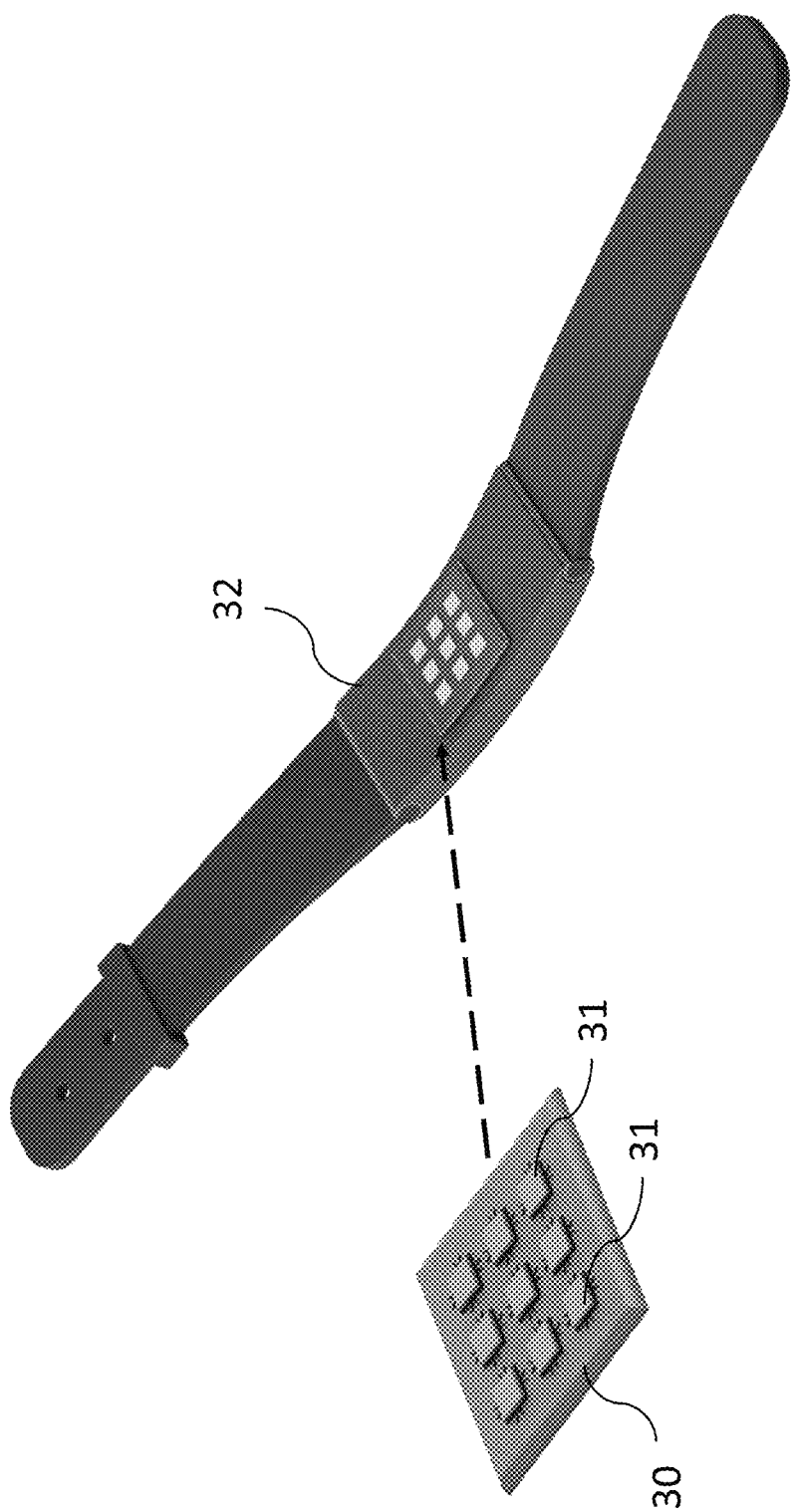
FIG. 3 Illustrates a set of sensing nodes and their application as a wearable device according to a particular example embodiment.

FIG. 3 Illustrates a set of sensing nodes 31 and their application as a wearable device 32 according to a particular example embodiment. Referring to FIG. 3, a substrate 30 comprising a set of nine sensing nodes 31 is provided. Each sensing node 31 may comprise a specific sensing material and/or a specific recognition element. Each sensing node 31 may be fabricated (as described above) to specifically interact with a particular target molecule. When an analyte, for example sweat, interacts with sensing nodes 31, several target molecules of interest, for example glucose, lactate, and dopamine can be detected simultaneously, based on the sensing material(s), recognition element(s), and calibration data available for each sensing node 31. If a particular target molecule interacts with (e.g., impacts the signal of) more than one sensing node 31, machine learning may be applied to identify and/or quantify the target molecules of interest, based on analyzing the combination of signals from sensing nodes 31. A disposable membrane (not shown) may be applied to cover one or more sensing nodes 31. Sensing nodes 31 may be integrated into a wearable device 32, such as a wrist band or watch in the case of the illustrated embodiment. Sensing nodes 31 may also be added to or integrated into a smartwatch.

Figure 4:
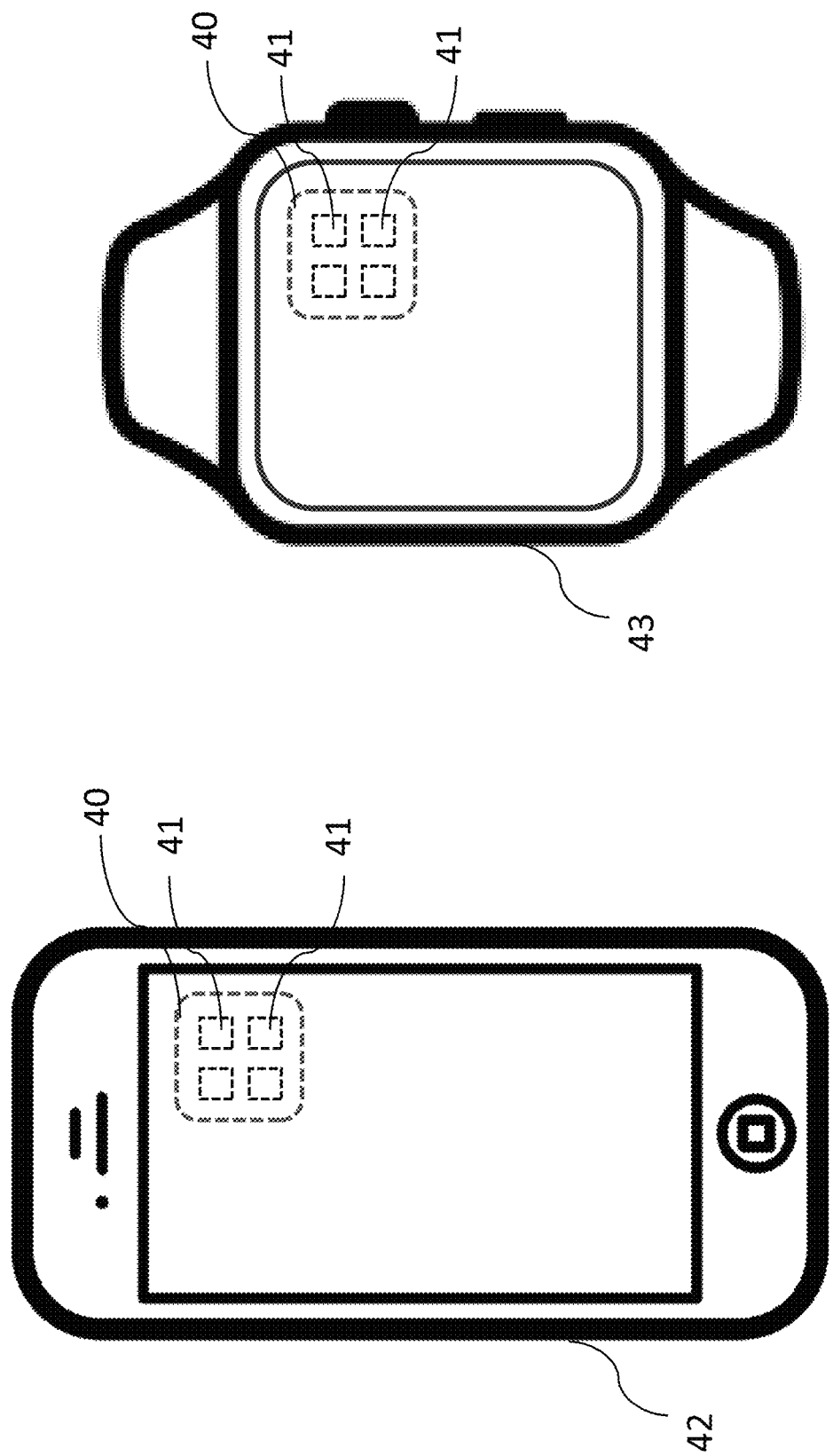
FIG. 4 Illustrates a set of sensing nodes and their application as an air monitoring sensor according to a particular example embodiment.

FIG. 4 Illustrates a set of sensing nodes 41 and their application as an air monitoring sensor inserted in a cellphone 42 and a wearable device 43 such as a smart watch according to a particular example embodiment. Referring to FIG. 4, a substrate 40 comprising a set of four sensing nodes 41 is provided. Each sensing node 41 may comprise a specific sensing material and/or a specific recognition element. Each sensing node 41 may be fabricated (as described above) to specifically interact with a particular gas molecule, for example specific greenhouse gases or indoor air pollutants, for example $CO_2$, $CH_4$, or volatile organic compounds (VOCs). When air interacts with sensing nodes 41, several target molecules of interest, for example greenhouse gases or toxic gases may be detected simultaneously, based on the sensing material(s), recognition element(s), and calibration data available for each sensing node 41. Such information may be shared on a platform for the global monitoring of air quality in real time.

Figure 5:
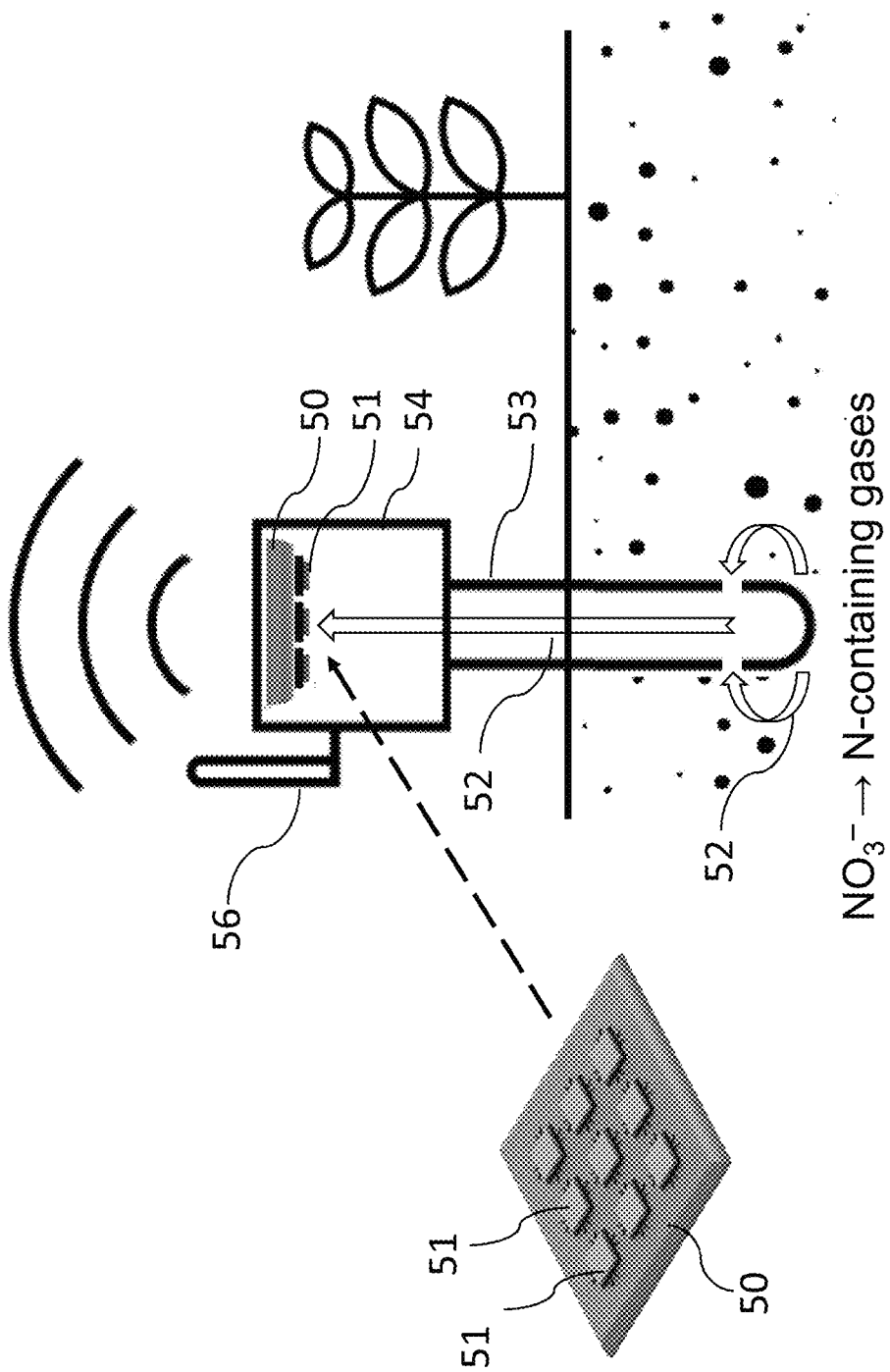
FIG. 5 Illustrates a set of sensing nodes and their application for measuring soil nutrients according to a particular example embodiment.

FIG. 5 Illustrates a set of sensing nodes 51 and their application for measuring soil nutrients according to a particular example embodiment. Referring to FIG. 5, a substrate 50 comprising a set of nine sensing nodes 51 is provided. Each sensing node 51 may comprise a specific sensing material and/or a specific recognition element. Each sensing node 51 may be fabricated (as described above) to specifically interact with a particular target molecule. In the illustrated embodiment of FIG. 5, as an example, the application of a sensing node 51 for measuring nitrogen as a key soil nutrient is illustrated. A nitrogen-sensing node 51 can be exposed to the air in the vicinity of (and largely in equilibrium with) the soil. The nitrogen-containing gases, such as $N_2O$, $NO_2$ and $NH_3$ in air that are in equilibrium with soil nitrate, $NO_3^-$, come into contact with (spreading by different means, such as diffusion, for example) sensor nodes 51, in chamber 54. Diffusion of the gases generated in the soil may be provided with flow paths 52 from the soil into channel 53 (which is in fluid communication with chamber 54) to establish the equilibrium between the soil being evaluated and the surrounding air. By quantifying the concentration of nitrogen containing gases in the air in equilibrium with the soil, average values of soil nitrogen (or nitrate/ammonia) may be estimated. The soil nutrients may be measured at any desirable depth in the soil, by positioning the inlet flow paths 52 of channel 53 that is connected to the sensor chamber 54, at different depths below the ground. The FIG. 5 sensor includes an optional wireless communication unit 56 for communicating measured results to a suitable remote location.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g., a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A sensor for detecting a presence or quantity of a target molecule in an analyte, the sensor comprising:
   a radiation-activatable sensing material locatable in proximity to the analyte;
   a plurality of electrodes in electrical contact with the sensing material;
   a radiation emitter configured to direct radiation toward the sensing material, the radiation, upon impinging on the sensing material, causing photo-excitation of the sensing material, thereby altering an interaction between the sensing material and the target molecule relative to a baseline interaction between the sensing material and the target molecule in an absence of the radiation;
   wherein the interaction between the sensing material and the target molecule influences one or more electrical characteristics of the sensing material in a manner that is detectable at the plurality of electrodes.

2. The sensor according to claim 1 comprising a recognition element for selective interaction with the target molecule and wherein the interaction between the sensing material and the target molecule comprises interaction between the sensing material, the recognition element and the target molecule.

3. The sensor according to claim 1 comprising a power source and one or more electronic components for measuring at least one of: potential, current, and resistance, wherein the power source is connected to apply a potential or current to a pair of the plurality of electrodes and the one or more electronic components are configured to measure at least one of: the potential, current, and resistance between the electrode pair.

4. The sensor according to claim 1 wherein the sensing material is provided as a sensing layer, at least one of the plurality of electrodes is in electrical contact with an electrode side of the sensing layer and the radiation emitter is configured to direct radiation toward the sensing layer from the electrode side.

5. The sensor according to claim 4 comprising a substrate that is transparent to the radiation emitted by the radiation emitter and wherein the plurality of electrodes are located on the transparent substrate in electrical contact with the electrode side of the sensing layer.

6. The sensor according to claim 1 wherein the radiation emitter comprises a solid-state UV emitter.

7. The sensor according to claim 1 wherein the sensing material comprises a photo-activatable semiconductor material.

8. The sensor according to claim 7 wherein the photo-activatable semiconductor material comprises at least one of a metal oxide and a mixed metal oxide.

9. The sensor according to claim 8 wherein the sensing material comprises at least one of: zinc oxide (ZnO), indium oxide ($In_2O_3$), and zirconium oxide ($ZrO_2$).

10. The sensor according to claim 2 wherein the recognition element comprises an enzyme.

11. The sensor according to claim 10 wherein the enzyme comprises at least one of glucose oxide and lactate oxide.

12. The sensor according to claim 1 wherein the sensing material is at least one of decorated, doped and functionalized with at least one of metal particles, non-metal particles, a catalyst, and a polymer.

13. The sensor according to claim 1 comprising a porous material that is integrated with the sensing material, located on the sensing material, or otherwise located between the sensing material and the analyte during operation of the sensor.

14. The sensor according to claim 1 comprising a plurality of different radiation-activatable sensing materials and wherein interaction between each of the plurality of sensing materials and a corresponding target molecule influences one or more electrical characteristics of the sensing material in a manner that is detectable at the plurality of electrodes.

15. The sensor according to claim 1 wherein the radiation emitter is configurable to emit radiation of at least one of: a plurality of different intensities and a plurality of different wavelengths.

16. The sensor according to claim 15 wherein the radiation emitter comprises a plurality of radiation emitters, each radiation emitter configurable to emit radiation at one or both of: one of the plurality of different intensities and one of the plurality of different wavelengths.

17. The sensor according to claim 15 wherein the sensing material comprises a plurality of sensing materials, each sensing material located to be irradiated by one or both of: at least one of the plurality of different intensities and at least one of the plurality of different wavelengths.

18. The sensor according to claim 1 wherein the sensor is integrated into a laptop, a mobile phone, and a watch.

19. A sensor for detecting a presence or quantity of a plurality of different target molecules in an analyte, the sensor comprising:

a radiation-activatable sensing material locatable in proximity to the analyte;

a plurality of electrodes in electrical contact with the sensing material;

a radiation emitter configured to direct radiation toward the sensing material, the radiation, upon impinging on the sensing material, causing photo-excitation of the sensing material, thereby altering an interaction between the sensing material and at least one of the plurality of different target molecules relative to a baseline interaction between the sensing material and the at least one of the plurality of different target molecules in an absence of the radiation;

wherein the interaction between the sensing material and the at least one of the plurality of different target molecules influences one or more electrical characteristics of the sensing material in a manner that is detectable at the plurality of electrodes;

wherein the sensor further comprises a plurality of different recognition elements for selective interaction with individual target molecules from among the plurality of different target molecules and wherein interaction between the sensing material, each of the plurality of different recognition elements, and the individual target molecules from among the plurality of different target molecules influences one or more electrical characteristics of the sensing material in a manner that is detectable at the plurality of electrodes.

20. The sensor according to claim 19 comprising a plurality of different radiation-activatable sensing materials and wherein interaction between each of the plurality of different radiation-activatable sensing materials, each of the plurality of different recognition elements, and the individual target molecules from among the plurality of different target molecules influences one or more electrical characteristics of the sensing material in a manner that is detectable at the plurality of electrodes.

21. The sensor according to claim 1 fabricated on at least one of: a UV-LED chip or wafer and a UV-LED package.

22. Use of the sensor according to claim 1 for detecting the presence of or estimating the quantity of the target molecule in a fluid.

23. The use according to claim 22 wherein at least one of:
the target molecule is a biomarker, and the fluid is a biofluid;
the target molecule is a pollutant, and the fluid is air or water;
the target molecule comprises nitrogen-containing gas molecules in a vicinity of soil for estimation of soil nutrients, and the fluid is air in the vicinity of the soil.

24. A method for detecting a presence or quantity of a target molecule in a fluid analyte, the method comprising:
establishing contact between the analyte and the sensor according to claim 1; and
detecting a signal from the sensor.

25. The method according to claim 24 wherein the sensor comprises a plurality of sensors according to claim 1 and the method comprises:
for each sensor, detecting signals from the plurality of sensors; and
analyzing the detected signals from the plurality of sensors using an artificial intelligence engine trained by machine learning or deep learning to detect the presence or quantity of the target molecule in the analyte.

26. Use of the sensor according to claim 1 for detecting the presence of or estimating the quantity of the target molecule in a soil.

27. The sensor according to claim 6 wherein the solid-state UV emitter comprises an ultraviolet light emitting diode.

\* \* \* \* \*